US012355196B2

(12) United States Patent
De Dios Martín et al.

(10) Patent No.: US 12,355,196 B2
(45) Date of Patent: *Jul. 8, 2025

(54) LATCH FOR TELECOMMUNICATIONS CONNECTOR

(71) Applicant: CommScope Connectivity Spain, S.L., Madrid (ES)

(72) Inventors: Longinos De Dios Martín, Barcelona (ES); Antonio Carreras García, Barcelona (ES)

(73) Assignee: CommScope Connectivity Spain, S.L., Alcobendas (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,050

(22) Filed: May 23, 2022

(65) Prior Publication Data

US 2022/0399686 A1 Dec. 15, 2022

Related U.S. Application Data

(63) Continuation of application No. 15/562,385, filed as application No. PCT/ES2016/070213 on Mar. 26, 2016, now Pat. No. 11,342,718.

(30) Foreign Application Priority Data

Mar. 27, 2015 (ES) ............................... ES201530419

(51) Int. Cl.

| | |
|---|---|
| ***H01R 13/74*** | (2006.01) |
| ***H01R 13/627*** | (2006.01) |
| *H01R 24/64* | (2011.01) |

(52) U.S. Cl.

CPC ....... *H01R 13/745* (2013.01); *H01R 13/6275* (2013.01); *H01R 24/64* (2013.01)

(58) Field of Classification Search

None

See application file for complete search history.

(56) References Cited

U.S. PATENT DOCUMENTS 3,666,996 A 5/1972 Brown
3,739,076 A 6/1973 Schwartz
(Continued)

FOREIGN PATENT DOCUMENTS

CN 101095264 A 12/2007
CN 101510649 A 8/2009
(Continued)

OTHER PUBLICATIONS

Extended European Search Report for Application No. 17841856.2 mailed Feb. 19, 2020.
(Continued)

*Primary Examiner* — Felix O Figueroa
(74) *Attorney, Agent, or Firm* — Merchant & Gould P.C.

(57) ABSTRACT

A connector assembly (10) includes a main body (12) and a latch member (30). In one aspect, the latch member (30) is formed as a spring and has a first portion (32) with a locking rib structure (38) that can be depressed towards the main body (12) to allow the connector assembly (10) to be inserted through a front side (102*a*) or a back side (102*b*) of an opening (102) in a panel (100). After insertion, the first portion (32) can then be released such that a retention structure (18) of the main body (12) and the locking rib structure (38) engage opposite ends of an opening (102) to secure the connector assembly (10) within the opening (102). The same connector (10) assembly (10) can be used with openings (102, 202, 302) of different sizes without modification.

10 Claims, 12 Drawing Sheets

(56) References Cited

U.S. PATENT DOCUMENTS

| | | | |
|---|---|---|---|
| 3,830,957 | A | 8/1974 | Oberdiear |
| 4,284,316 | A | 8/1981 | Debaigt |
| 4,537,458 | A | 8/1985 | Worth |
| 4,660,912 | A | 4/1987 | Tomek |
| 4,679,879 | A | 7/1987 | Triner et al. |
| 4,721,476 | A | 1/1988 | Zeliff et al. |
| 4,747,785 | A | 5/1988 | Roberts et al. |
| 4,760,215 | A | 7/1988 | Cook et al. |
| 4,790,765 | A | 12/1988 | Ehrenfels et al. |
| 4,810,210 | A | 3/1989 | Komatsu |
| 4,824,400 | A | 4/1989 | Spinner |
| 4,830,628 | A | 5/1989 | Dyson et al. |
| 4,842,553 | A | 6/1989 | Ingram |
| 4,857,015 | A | 8/1989 | Michaels et al. |
| 5,021,610 | A | 6/1991 | Roberts |
| 5,074,803 | A | 12/1991 | Chandler et al. |
| 5,169,346 | A | 12/1992 | Johnston |
| 5,238,416 | A | 8/1993 | Dickie |
| 5,240,436 | A | 8/1993 | Bradley et al. |
| 5,278,352 | A | 1/1994 | Schade |
| 5,310,359 | A | 5/1994 | Chadbourne et al. |
| 5,445,538 | A | 8/1995 | Rodrigues et al. |
| 5,571,023 | A | 11/1996 | Anthony |
| 5,637,002 | A | 6/1997 | Buck et al. |
| 5,675,126 | A | 10/1997 | Halvorsen |
| 5,691,506 | A | 11/1997 | Miyazaki et al. |
| 5,697,806 | A | 12/1997 | Whiteman, Jr. et al. |
| 5,762,517 | A | 6/1998 | Abe |
| 5,769,647 | A | 6/1998 | Tulley et al. |
| 6,015,307 | A | 1/2000 | Chiu et al. |
| 6,077,122 | A | 6/2000 | Elkhatib et al. |
| 6,086,415 | A | 7/2000 | Sanchez et al. |
| 6,244,908 | B1 | 6/2001 | Hammond et al. |
| 6,247,849 | B1 | 6/2001 | Liu |
| 6,254,403 | B1 | 7/2001 | Bernardini |
| 6,292,564 | B1 | 9/2001 | Cowan et al. |
| 6,309,247 | B1 | 10/2001 | Wang |
| 6,354,851 | B1 | 3/2002 | Bachle |
| 6,386,915 | B1 | 5/2002 | Nelson |
| 6,394,853 | B1 | 5/2002 | Hammond et al. |
| 6,425,694 | B1 | 7/2002 | Szilagyi et al. |
| 6,520,781 | B2 | 2/2003 | Koide et al. |
| 6,537,104 | B1 | 3/2003 | Hagmann et al. |
| 6,612,750 | B1 | 9/2003 | Bull et al. |
| 6,652,152 | B2 | 11/2003 | Yang et al. |
| 6,702,477 | B1 | 3/2004 | Ngo |
| 6,848,833 | B1 | 2/2005 | Kamarauskas et al. |
| 6,866,541 | B2 | 3/2005 | Barker et al. |
| 6,872,090 | B2 | 3/2005 | De Dios Martin |
| 6,890,205 | B1 * | 5/2005 | Wu .................... H01R 13/6275 439/906 |
| 7,029,182 | B2 | 4/2006 | Ngo |
| 7,033,219 | B2 | 4/2006 | Gordon et al. |
| 7,087,840 | B2 | 8/2006 | Herring et al. |
| 7,112,090 | B2 | 9/2006 | Caveney et al. |
| 7,156,696 | B1 | 1/2007 | Montena |
| 7,207,846 | B2 | 4/2007 | Caveney et al. |
| 7,220,145 | B2 | 5/2007 | Denovich et al. |
| 7,273,383 | B1 | 9/2007 | Bennett |
| 7,329,139 | B2 | 2/2008 | Benham |
| 7,338,317 | B1 * | 3/2008 | Nagy ................... H01R 13/745 439/555 |
| 7,340,146 | B2 | 3/2008 | Lampert et al. |
| 7,384,298 | B2 | 6/2008 | Caveney et al. |
| 7,416,448 | B2 | 8/2008 | Gaidosch |
| 7,476,120 | B2 | 1/2009 | Patel et al. |
| 7,510,421 | B2 | 3/2009 | Fransen et al. |
| 7,621,772 | B1 | 11/2009 | Tobey |
| 7,628,644 | B1 | 12/2009 | Peluffo |
| 7,628,657 | B2 | 12/2009 | Martich |
| 7,637,769 | B2 | 12/2009 | Carreras Garcia et al. |
| 7,645,160 | B2 | 1/2010 | Tabet |
| 7,676,133 | B2 | 3/2010 | Lampert et al. |
| 7,722,402 | B2 * | 5/2010 | Pepe .................. H01R 13/6583 439/607.18 |
| 7,727,013 | B1 | 6/2010 | Paynter |
| 7,766,688 | B2 | 8/2010 | Mateo Ferrus et al. |
| 7,806,721 | B2 | 10/2010 | Herndon et al. |
| 7,819,698 | B2 | 10/2010 | Islam |
| 7,854,624 | B1 | 12/2010 | Pepe |
| 7,857,663 | B2 | 12/2010 | Chantrell et al. |
| 7,871,285 | B1 | 1/2011 | Tobey et al. |
| 7,874,865 | B2 | 1/2011 | Tobey |
| 7,909,622 | B2 | 3/2011 | Pepe et al. |
| 7,938,680 | B1 | 5/2011 | Hsieh |
| 7,955,120 | B2 | 6/2011 | Patel et al. |
| 8,057,249 | B1 | 11/2011 | Tobey et al. |
| 8,070,506 | B2 | 12/2011 | De Dios Martin et al. |
| 8,075,344 | B2 | 12/2011 | Shih |
| 8,109,784 | B2 | 2/2012 | Patel et al. |
| 8,241,055 | B2 | 8/2012 | Chen |
| 8,376,786 | B2 | 2/2013 | Carreras Garcia et al. |
| 8,454,383 | B2 | 6/2013 | Paynter et al. |
| 8,747,126 | B2 | 6/2014 | Corbett et al. |
| 8,758,065 | B2 | 6/2014 | Fransen et al. |
| 8,791,374 | B1 | 7/2014 | Smith |
| 8,834,196 | B2 | 9/2014 | Duran et al. |
| 8,911,256 | B2 | 12/2014 | Qiao et al. |
| 9,022,792 | B2 | 5/2015 | Sticker et al. |
| 9,583,885 | B2 | 2/2017 | Ruesca Fernandez |
| 9,608,369 | B1 | 3/2017 | Brandt et al. |
| 9,627,827 | B2 | 4/2017 | Bragg |
| 9,640,898 | B1 | 5/2017 | Wubbels |
| 9,761,998 | B2 | 9/2017 | De Dios Martin et al. |
| 9,768,556 | B2 | 9/2017 | Bopp et al. |
| 9,832,542 | B2 * | 11/2017 | Carreras Garcia ...... H04Q 1/13 |
| 9,847,607 | B2 | 12/2017 | Bopp et al. |
| 9,893,473 | B2 | 2/2018 | Kong et al. |
| 10,476,212 | B2 | 11/2019 | Bopp et al. |
| 10,522,939 | B2 | 12/2019 | De Dios Martin |
| 10,594,088 | B2 | 3/2020 | Cupples et al. |
| 10,651,608 | B2 | 5/2020 | White |
| 10,777,953 | B2 | 9/2020 | White et al. |
| 10,784,640 | B2 | 9/2020 | Font Aranega et al. |
| 10,958,012 | B2 | 3/2021 | De Dios Martin |
| 11,342,718 | B2 | 5/2022 | De Dios Martin et al. |
| 11,356,751 | B2 | 6/2022 | White et al. |
| 11,367,985 | B2 | 6/2022 | White et al. |
| 2002/0052137 | A1 | 5/2002 | Hayashi et al. |
| 2002/0058432 | A1 | 5/2002 | Chen et al. |
| 2002/0119681 | A1 | 8/2002 | Follingstad et al. |
| 2003/0081907 | A1 | 5/2003 | Malagrino, Jr. et al. |
| 2004/0038582 | A1 | 2/2004 | Clement |
| 2004/0209515 | A1 | 10/2004 | Caveney et al. |
| 2004/0229501 | A1 | 11/2004 | Caveney et al. |
| 2005/0103672 | A1 | 5/2005 | Peng |
| 2005/0159036 | A1 | 7/2005 | Caveney et al. |
| 2005/0201071 | A1 | 9/2005 | AbuGhazaleh et al. |
| 2006/0110986 | A1 | 5/2006 | King, Jr. et al. |
| 2006/0204200 | A1 | 9/2006 | Lampert et al. |
| 2007/0054521 | A1 | 3/2007 | John |
| 2007/0093120 | A1 | 4/2007 | Hardy et al. |
| 2007/0240902 | A1 | 10/2007 | Tapper |
| 2008/0090461 | A1 | 4/2008 | Pepe et al. |
| 2008/0096438 | A1 | 4/2008 | Clark et al. |
| 2008/0102686 | A1 | 5/2008 | Carreras Garcia et al. |
| 2008/0268719 | A1 | 10/2008 | Siemon et al. |
| 2008/0311800 | A1 | 12/2008 | Tsai |
| 2009/0004913 | A1 | 1/2009 | Caveney et al. |
| 2009/0034226 | A1 | 2/2009 | Herndon et al. |
| 2009/0243757 | A1 | 10/2009 | Xu et al. |
| 2009/0258545 | A1 | 10/2009 | Pepe et al. |
| 2009/0274422 | A1 | 11/2009 | Henry et al. |
| 2009/0311904 | A1 | 12/2009 | Chen |
| 2009/0318033 | A1 | 12/2009 | Tobey |
| 2009/0325420 | A1 | 12/2009 | Paynter |
| 2010/0151707 | A1 | 6/2010 | AbuGhazaleh et al. |
| 2010/0216335 | A1 | 8/2010 | Cobb |
| 2010/0255716 | A1 | 10/2010 | Frey et al. |
| 2011/0030343 | A1 | 2/2011 | Kiser et al. |
| 2011/0038581 | A1 | 2/2011 | Mudd et al. |
| 2011/0097924 | A1 | 4/2011 | Chen |
| 2011/0115494 | A1 | 5/2011 | Taylor et al. |
| 2011/0304343 | A1 | 12/2011 | Font Aranega et al. |

(56) References Cited

U.S. PATENT DOCUMENTS

| | | | |
|---|---|---|---|
| 2012/0196472 | A1 | 8/2012 | Fitzpatrick |
| 2012/0226807 | A1 | 9/2012 | Panella et al. |
| 2012/0244736 | A1 | 9/2012 | Duran et al. |
| 2012/0244752 | A1 | 9/2012 | Patel et al. |
| 2012/0322307 | A1 | 12/2012 | Kudo |
| 2013/0203291 | A1 | 8/2013 | Sticker et al. |
| 2013/0210264 | A1 | 8/2013 | Rynaski et al. |
| 2013/0217249 | A1 | 8/2013 | Patel et al. |
| 2013/0255990 | A1 | 10/2013 | Rothbauer et al. |
| 2013/0260582 | A1 | 10/2013 | White |
| 2014/0000954 | A1 | 1/2014 | Furukawa |
| 2014/0080354 | A1 | 3/2014 | Caveney et al. |
| 2014/0242855 | A1 | 8/2014 | Kan et al. |
| 2014/0287609 | A1 | 9/2014 | Fransen et al. |
| 2014/0335726 | A1 | 11/2014 | Zhang |
| 2015/0349468 | A1 | 12/2015 | Singer et al. |
| 2016/0080836 | A1 | 3/2016 | Carreras Garcia |
| 2016/0248197 | A1 | 8/2016 | Fransen et al. |
| 2016/0285205 | A1 | 9/2016 | Ruesca Fernandez |
| 2017/0229825 | A1 | 8/2017 | Baines et al. |
| 2017/0302040 | A1 | 10/2017 | Taylor et al. |
| 2018/0248292 | A1 | 8/2018 | Hashiguchi |
| 2018/0287312 | A1 | 10/2018 | De Dios Martin et al. |
| 2018/0358739 | A1 | 12/2018 | De Dios Martin |
| 2019/0190218 | A1 | 6/2019 | White et al. |
| 2020/0137465 | A1 | 4/2020 | White et al. |
| 2020/0244003 | A1 | 7/2020 | De Dios Martin |
| 2020/0267862 | A1 | 8/2020 | Taguchi et al. |
| 2020/0351573 | A1 | 11/2020 | Shih |
| 2021/0104850 | A1 | 4/2021 | White et al. |
| 2021/0143600 | A1 | 5/2021 | Font Aranega et al. |
| 2021/0281009 | A1 | 9/2021 | De Dios Martin |

FOREIGN PATENT DOCUMENTS

| | | | |
|---|---|---|---|
| CN | 201303074 | Y | 9/2009 |
| CN | 201741918 | U | 2/2011 |
| CN | 201774068 | U | 3/2011 |
| CN | 202025948 | U | 11/2011 |
| CN | 102957034 | A | 3/2013 |
| CN | 203218574 | U | 9/2013 |
| CN | 103384042 | A | 11/2013 |
| DE | 101 13 230 | A1 | 9/2002 |
| EP | 0 073 112 | A1 | 3/1983 |
| EP | 0 775 845 | A2 | 5/1997 |
| EP | 1 189 085 | A2 | 3/2002 |
| EP | 1 422 793 | A1 | 5/2004 |
| EP | 1 443 608 | A2 | 8/2004 |
| EP | 1 484 824 | A2 | 12/2004 |
| EP | 2 133 957 | A1 | 12/2009 |
| ES | 2 178 813 | T3 | 1/2003 |
| ES | 2 257 514 | T3 | 8/2006 |
| ES | 1 138 538 | U | 4/2015 |
| ES | 2 583 636 | A1 | 9/2016 |
| ES | 2 584 539 | A1 | 9/2016 |
| ES | 2 600 968 | A1 | 2/2017 |
| FR | 2 701 007 | A1 | 8/1994 |
| FR | 2 893 454 | A1 | 5/2007 |
| GB | 221872 | A | 9/1924 |
| GB | 2 260 660 | A | 4/1993 |
| GB | 2 308 508 | A | 6/1997 |
| GB | 2 457 982 | A | 9/2009 |
| GB | 2 469 123 | A | 10/2010 |
| JP | 2001-244029 | A | 9/2001 |
| JP | 2006-126807 | A | 5/2006 |
| JP | 2007-299620 | A | 11/2007 |
| JP | 2007-313060 | A | 12/2007 |
| JP | 2013-235783 | A | 11/2013 |
| KR | 2001-0100594 | A | 11/2001 |
| KR | 20-2010-0008888 | U | 9/2010 |
| TW | M349117 | U | 1/2009 |
| WO | 95/34923 | A1 | 12/1995 |
| WO | 97/44862 | A1 | 11/1997 |
| WO | 99/19944 | A1 | 4/1999 |
| WO | 03/026076 | A1 | 3/2003 |
| WO | 2005/104300 | A1 | 11/2005 |
| WO | 2008/059203 | A2 | 5/2008 |
| WO | 2008/095830 | A1 | 8/2008 |
| WO | 2011/038387 | A1 | 3/2011 |
| WO | 2013/090201 | A1 | 6/2013 |
| WO | 2013/096279 | A1 | 6/2013 |
| WO | 2013/123154 | A1 | 8/2013 |
| WO | 2014/167449 | A1 | 10/2014 |
| WO | 2016/151172 | A1 | 9/2016 |
| WO | 2016/151177 | A1 | 9/2016 |
| WO | 2016/156643 | A1 | 10/2016 |
| WO | 2016/156644 | A1 | 10/2016 |
| WO | 2018/009698 | A1 | 1/2018 |
| WO | 2018/034870 | A1 | 2/2018 |
| WO | 2018/236875 | A1 | 12/2018 |
| WO | 2019/094558 | A1 | 5/2019 |

OTHER PUBLICATIONS

Extended European Search Report for Application No. 18820793.0 mailed Feb. 12, 2021.

Extended European Search Report for Application No. 18875839.5 mailed Jul. 19, 2021.

Extended European Search Report for Application No. 20174844.9 mailed Aug. 24, 2020.

First Office Action for Chinese Patent Application No. 201880072621.7 mailed Aug. 17, 2021, 21 pages.

International Search Report and Written Opinion for Application No. PCT/ES2016/070204 mailed Jun. 6, 2016.

International Search Report and Written Opinion for Application No. PCT/ES2016/070212 mailed Jun. 2, 2016.

International Search Report and Written Opinion for Application No. PCT/ES2016/070190 mailed Jul. 5, 2016.

International Search Report and Written Opinion for Application No. PCT/EP2016/069310 mailed Oct. 14, 2016.

International Search Report and Written Opinion for Application No. PCT/US2017/040947 mailed Oct. 13, 2017.

International Search Report and Written Opinion for Application No. PCT/US2017/045539 mailed Nov. 15, 2017.

International Search Report and Written Opinion for Application No. PCT/US2018/038295 mailed Oct. 16, 2018.

International Search Report and Written Opinion for Application No. PCT/US2018/059775 mailed Mar. 4, 2019.

International Search Report and Written Opinion of the International Searching Authority for corresponding International Patent Application No. PCT/ES2016/070213 mailed Jun. 7, 2016, 12 pages.

International Search Report and Written Opinion of the International Searching Authority for International Patent Application No. PCT/US2018/059780 mailed Mar. 4, 2019, 12 pages.

"Mini-Com All Metal Shielded Modular Patch Panels, Installation Instructions", Panduit, 2 pages (2010).

"Mini-Com® All Metal Shielded Modular Patch Panels, Installation Instructions, Specification Sheet", Panduit, 3 pages (2016).

Product Specifications: 1-1479191-3, SL Series Speaker Post Insert, red stripe, alpine white, CommScope, Inc., 1 page (Sep. 6, 2017).

State of the Art Report for Application No. 201530372 mailed Mar. 20, 2015.

State of the Art Report for Application No. 201530377 mailed Mar. 23, 2015.

State of the Art Report for Application No. 201530417 mailed Mar. 27, 2015.

State of the Art Report for Application No. 201530418 mailed Mar. 27, 2015.

State of the Art Report for Application No. 201530419 mailed Mar. 27, 2015.

State of the Art Report for Application No. 201531199 mailed Aug. 13, 2015.

* cited by examiner

LATCH FOR TELECOMMUNICATIONS CONNECTOR

CROSS-REFERENCE TO RELATED APPLICATION

This application is a continuation of U.S. patent application Ser. No. 15/562,385, filed on Sep. 27, 2017, now U.S. Pat. No. 11,342,718, which is a National Stage Application of PCT/ES2016/070213, filed on Mar. 26, 2016, which claims the benefit of Spanish Patent Application No. P201530419, filed on Mar. 27, 2015, the disclosures of which are incorporated herein by reference in their entireties. To the extent appropriate, a claim of priority is made to each of the above disclosed applications.

BACKGROUND

Electrical connectors are useful for providing a connection point for telecommunications systems. For example, RJ-type connectors can be provided as wall sockets wherein electronic data cables are terminated and mating electrical plugs can be inserted into the sockets. Various installation environments require connectors of different types such that the connector can be installed into a specifically sized opening or be installed from a front or back direction. Improvements are desired.

SUMMARY

A connector assembly is disclosed. In one aspect, the connector assembly includes a main body defining a jack cavity operably connected to a cable having a plurality of wires. In another aspect, the connector assembly includes a latch member connectable to the main body, wherein the latch member enables the connector assembly to be installed into an opening from a front or back side of the opening and wherein the latch member enables the connector assembly to be installed into openings of various sizes. In one aspect, the latch member is formed as a spring having a first portion with a locking rib structure at a free end. In one aspect, the first portion and locking rib structure can be depressed towards the main body to allow the connector assembly to be inserted through a front side or a back side of an opening in a panel and can be released such that the first retention structure and the locking rib structure engage opposite ends of the opening to secure the connector assembly within the opening.

A method for installing a connector assembly into an opening of a panel is also disclosed. The method can include the steps of providing a connector assembly of the aforementioned type; depressing the first portion and locking rib structure towards the main body; inserting the connector assembly into the opening; and releasing the first portion to allow the locking rib structure and first retention structure to engage the panel to secure the connector assembly within the opening.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
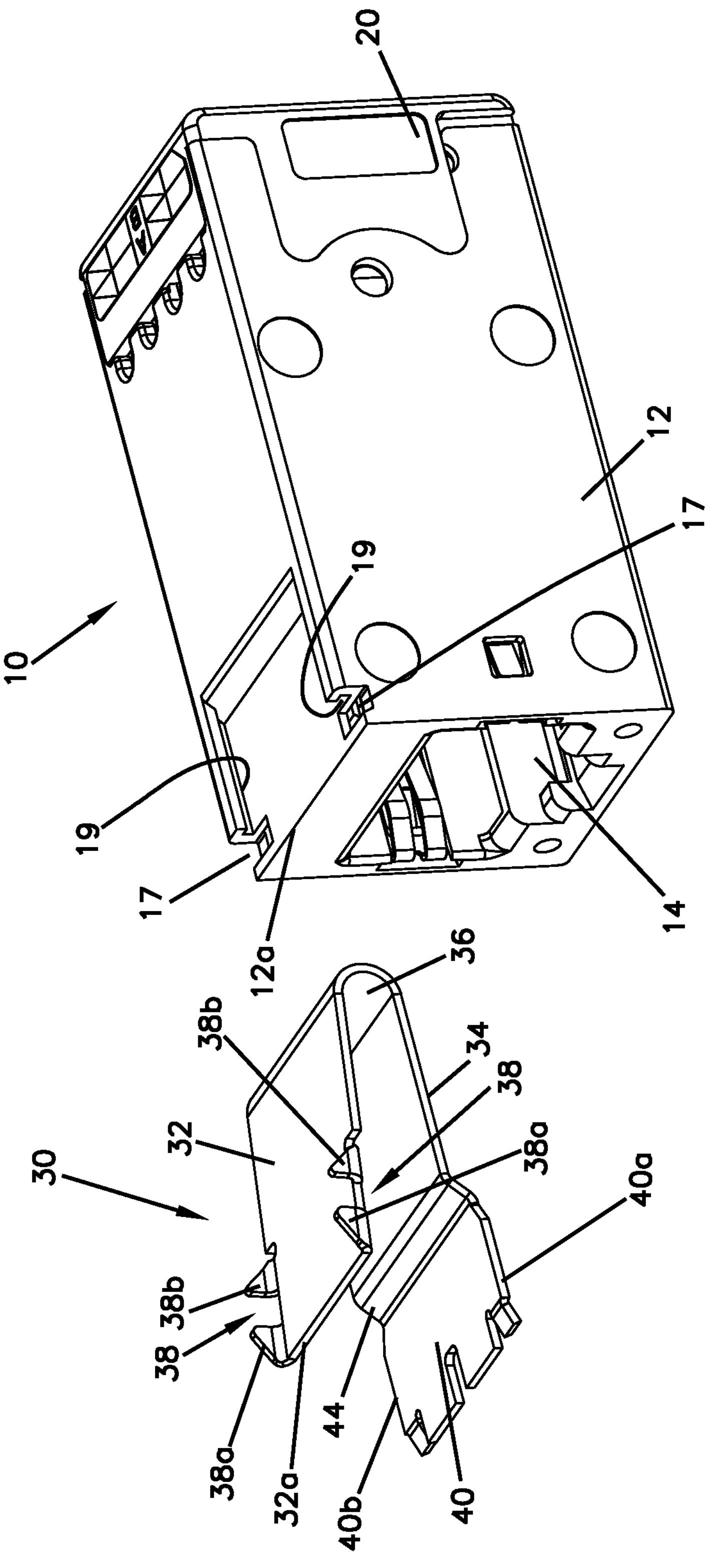
FIG. 1 is a front perspective view of a telecommunications connector assembly having a main body and a separated latch member having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A telecommunications connector assembly 10 is disclosed for connection with a cable 4 having a sheath 5 and a plurality of wires 6 is shown. In some examples, the sheath 5 can be formed from a metal braid, mesh, or foil. In one example, the cable 4 includes a plurality of insulated copper wires 6 while the connector assembly includes a main body 12 configured as a modular or RJ-type connector. As shown, the telecommunications connector main body 12 includes a jack cavity 14 for receiving a corresponding plug (not shown). In one aspect the main body 12 includes a plurality of electrical contact members 16 for which electrical connection to the wires 6 is made. In one aspect, the connector assembly 10 can include a cable management part 20 connected to the main body 12 for receiving and retaining the wires 6 from the cable 4 such that the wires 6 can be properly terminated to the connector assembly 10. The main body 12 can also be provided with a retention structure 18 having members 18_a_ and 18_b_, opposite the latch member 30, to further secure the connector assembly 10 within the opening 102.

In one aspect, the telecommunications connector assembly 10 includes a latch member 30 that can be removably attached to the main body 12. The latch member 30 is for securing the connector assembly 10 within an opening 102 of a connector panel 100. In one example, the latch member 30 is a unitary structure formed from a metal material, such as steel. A plastic material may also be used, although metal is preferred due to more suitable strength and flexibility properties, and because metal allows the latch member 30 to be made from a relatively thin material. Where metal is used, the latch member 30 can also serve to provide a grounding pathway.

Figure 3:
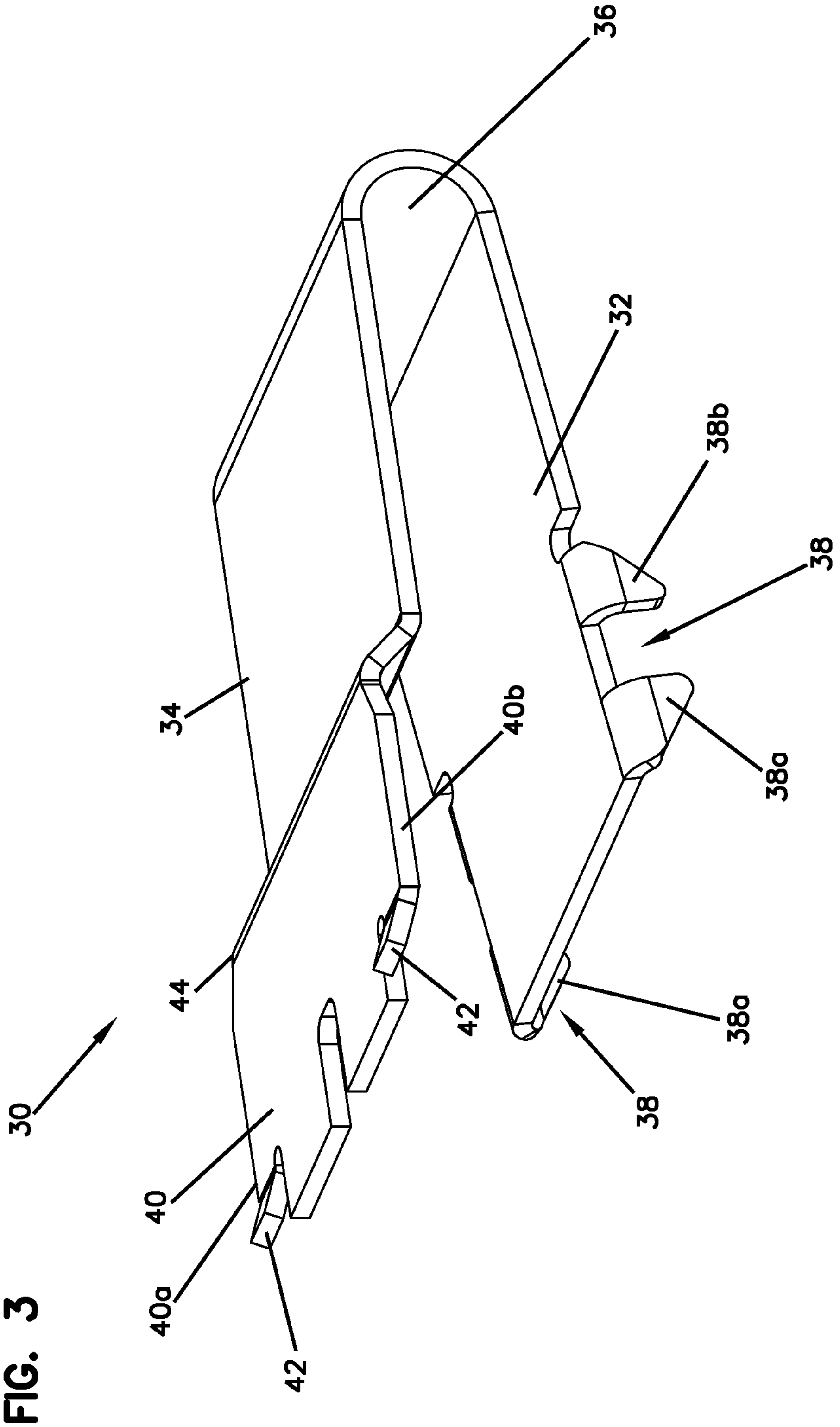
FIG. 3 is a bottom front perspective view of the latch member shown in FIG. 1.
Figure 4:
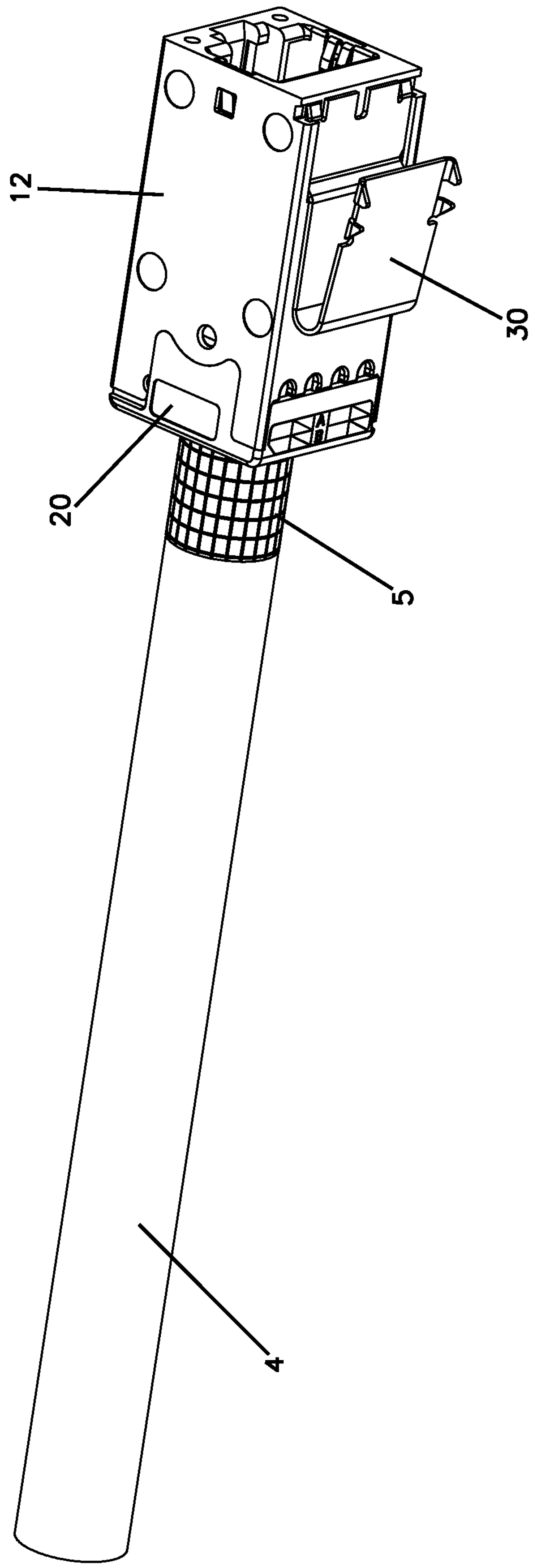
FIG. 4 is a front perspective view of the assembled connector assembly shown in FIG. 2 that has been terminated to a cable.
Figure 5:
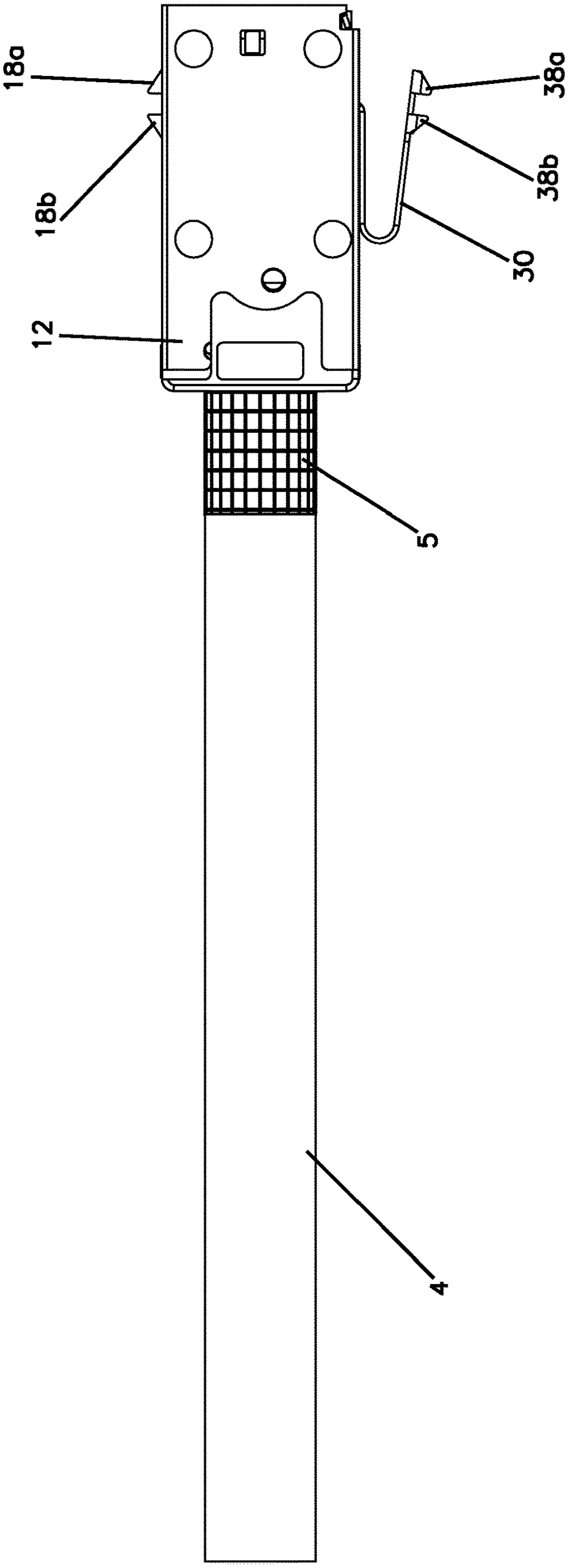
FIG. 5 is a side view of the assembled connector assembly and cable shown in FIG. 4.

As most easily seen at FIGS. 1 and 3, the latch member 30 can be provided with a first portion 32 and a second portion 34 that are joined by a third portion 36. As presented, the third portion 36 is curved or represents a bent portion of the latch member 30 such that the third portion 36 enables the latch member to perform a spring function. As shown, the third portion 36 holds the first portion 32 at an non-zero angle with respect to the second portion 34.

In one aspect, the first portion 32 includes a pair of locking rib structures 38, wherein each of the locking ribs includes a first rib 38_a_ and a spaced apart second rib 38_b_. The locking rib structures 38 are for engaging with the connector panel 100 adjacent the opening 102. Once installed, the first ribs 38_a_ engage a front side 100_a_ of the connector panel 100 while the second ribs 38_b_ engage a back side 100_b_ of the connector panel 100 such that the connector assembly 10 is locked in place into the opening 102.

Figure 2:
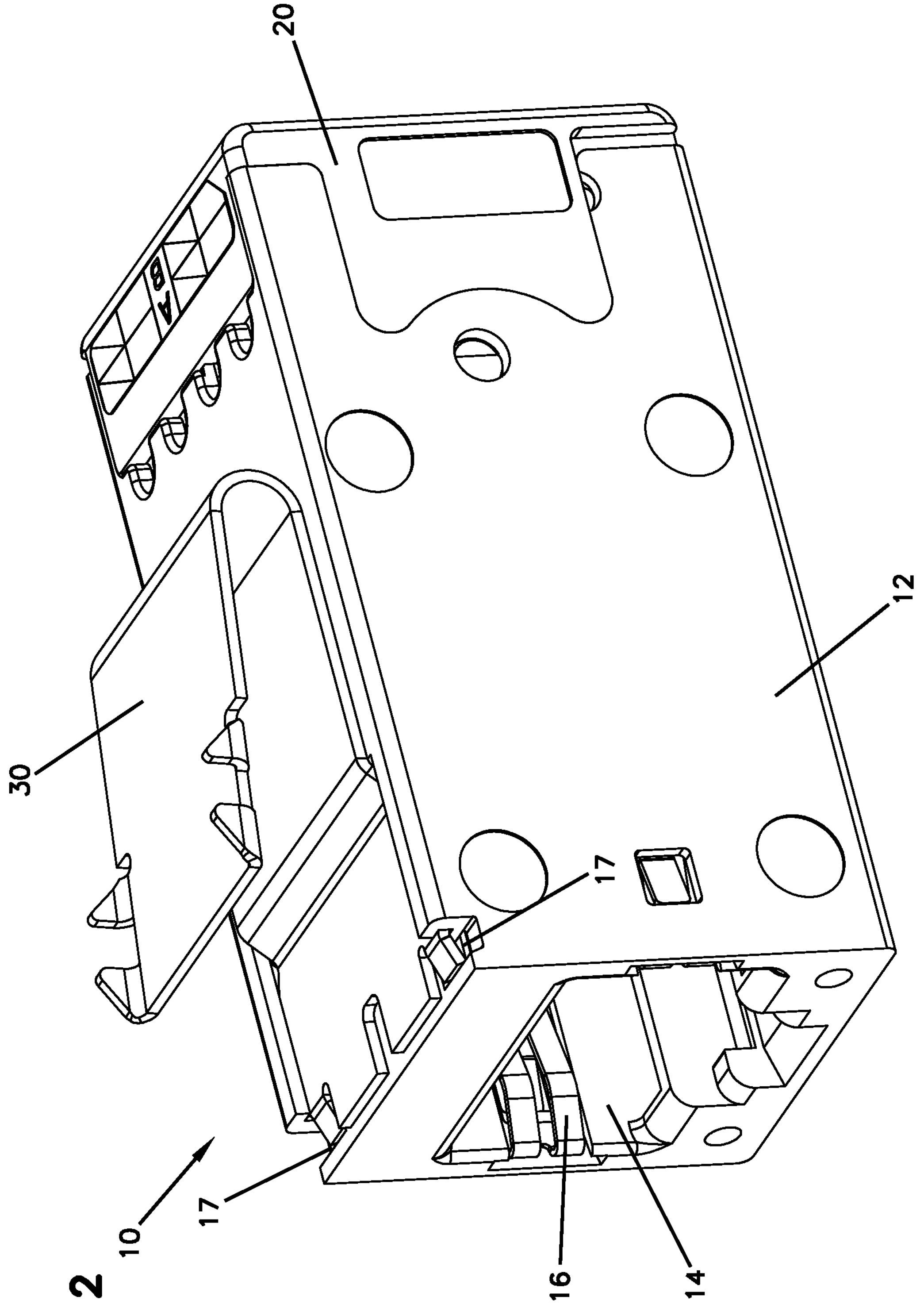
FIG. 2 is a front perspective view of the telecommunications connector assembly shown in FIG. 1 with the latch member having been joined to the main body.

In another aspect, the second portion 34 includes a retention structure 40. The retention structure 40 is for providing a secure connection between the latch member 30 and the main body 12 of the connector assembly 10. As shown, the retention structure 40 includes a pair of tabs 42. The tabs 42 are disposed at an angle relative to remainder of the retention structure 40, thereby creating a height difference between the tabs 42 and the remainder of the retention structure 40. With reference to FIG. 1, it can be seen that the main body 12 is provided with a pair of slot structures 19 which are configured for receiving the side edges 40_a_, 40_b_ of the retention structure up to the tabs 42. To facilitate installation of the latch member 30 onto the main body 12, the retention structure 40 also includes a ramped section 44 to offset the retention structure from the remaining portion of the second portion 34. This offset allows the latch member 30 to be installed such that at least part of the second portion 34 can be adjacent to the main body 12, as shown in FIG. 2.

Referring to FIG. 1, it can be seen that the latch member 30 is aligned with the main body 12 such that the side edges 40_a_, 40_b_ of the retention structure 40 can slide into the respective slot structures 19. As the side edges 40_a_, 40_b_ enter the slot structures 19 and the latch member 30 is pushed in a direction towards the cable manager part 20, the tabs 42 will eventually elastically deform over the top edge 12_a_ of the main body 12 and snap down into cavities 17 located in the main body 12. Once the tabs 42 are within the cavities 17, the latch member 30 is secured to the connector main body 12 such that the latch member 30 cannot be displaced in a direction towards the cavity 14. Other approaches for attaching the latch member 30 to the main body 12 may also be used without departing from the concepts disclosed herein, for example, fasteners, adhesives, differently configured tabs, barbs, and other methods and structures may be utilized.

Figure 6:
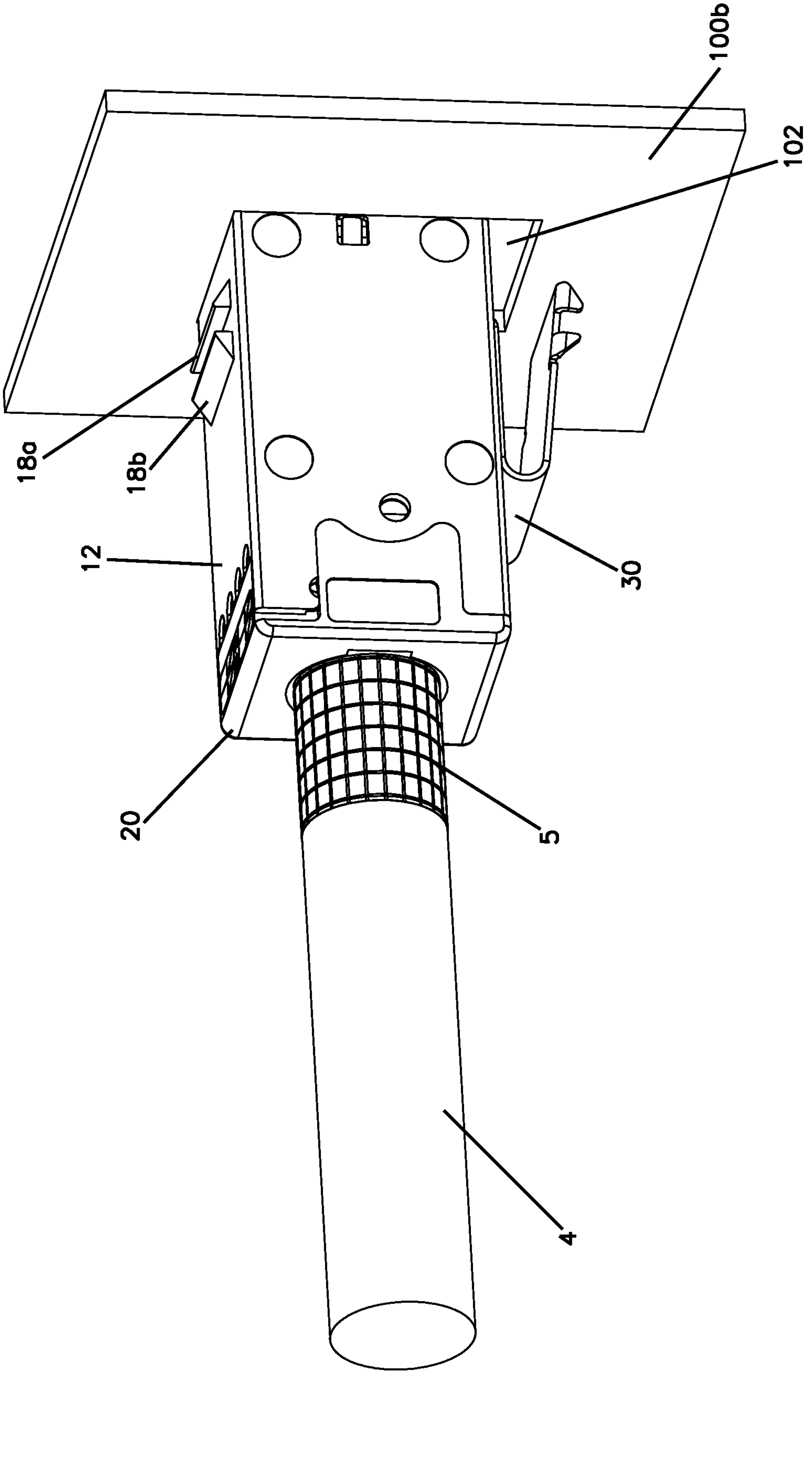
FIG. 6 is a rear perspective view of the assembled connector assembly and cable shown in FIG. 4 being inserted into a first opening of a first connection panel, from the back side of a connection panel.
Figure 7:
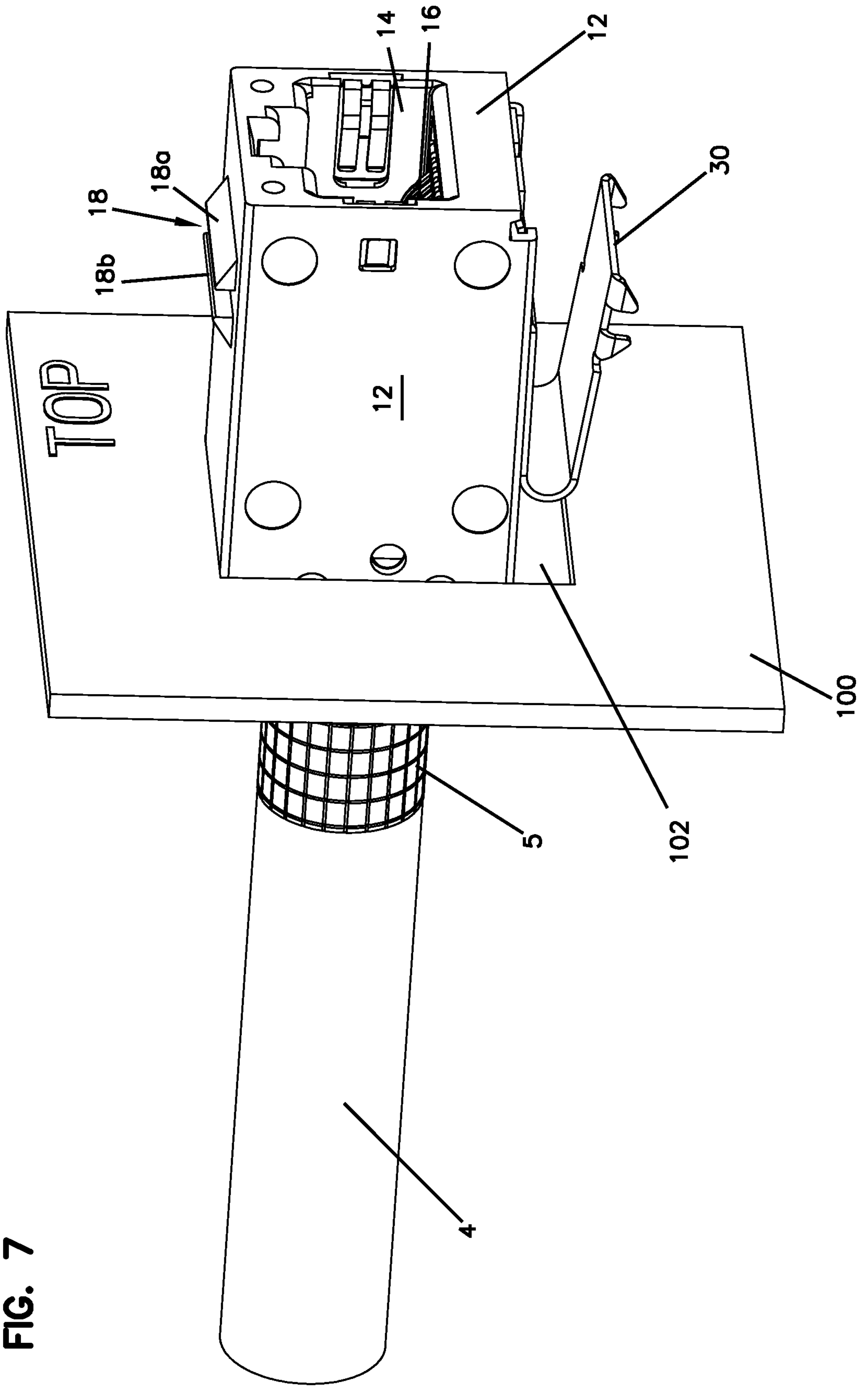
FIG. 7 is a front perspective view of the assembled connector assembly and cable shown in FIG. 4 being inserted into the first opening from the front side of the first connection panel shown in FIG. 6.

Referring to FIG. 6, it can be seen that the connector assembly 10 can be installed from a back side 100_b_ of a connection panel 100 and into an opening 102. FIG. 7 shows that the connector assembly 10 can also be installed from a front side 100_a_ of the connection panel 100 into the opening 102. This feature of being able to insert the connector assembly 10 into the opening 102 from either side of the plate 100 is an improvement over prior art connectors that can only be inserted from one direction.

Figure 8:
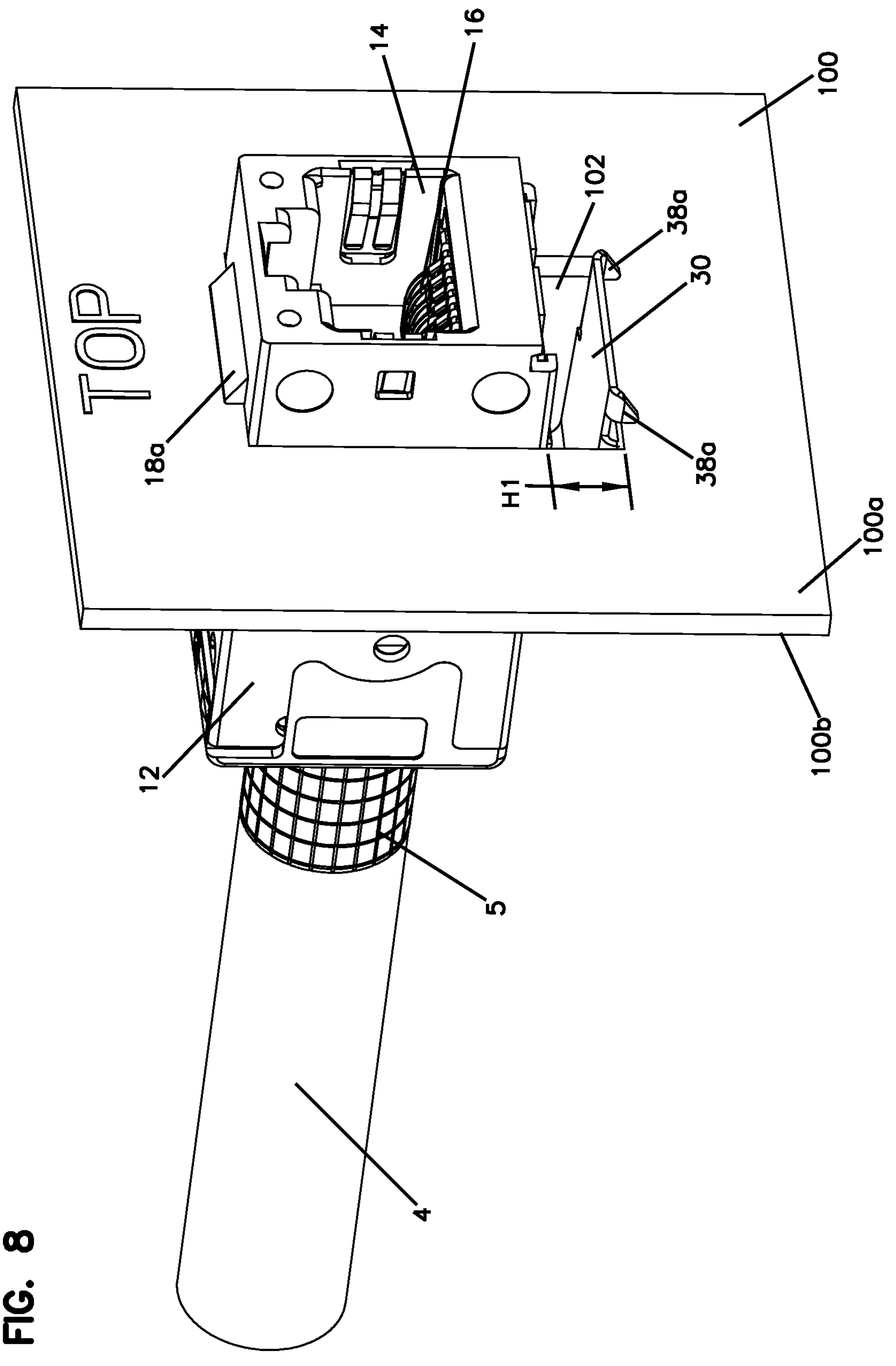
FIG. 8 is a front perspective view of the assembled connector assembly and cable shown in FIG. 4 after having been installed into the connection panel opening shown in FIGS. 6 and 7.

As can be seen at FIG. 8, the connector assembly 10 has been fully installed into the opening 102 (from either direction) such that the ribs 38_a_ and retention member 18_a_ are secured against the first side 100_a_ of the plate 100 and such that ribs 38_b_ and retention member 18_b_ are secured against the second side 100_b_ of the plate 100. In order to move the connector assembly 10 from either of the positions shown in FIG. 6 or 7, a user simply depresses the free end 32_a_ of the first portion 32 of the latch member 30 towards the main body 12 until enough clearance exists to insert tabs 38_a_ or 38_b_ (depending on direction of insertion) through the opening 102. Once this position has been reached, the user can release the first portion 32 and the spring action caused by the third portion 36 will urge the main body 12 towards the top of the opening 102. At this point, the connector assembly 10 is secured to the plate 100.

Figure 9:
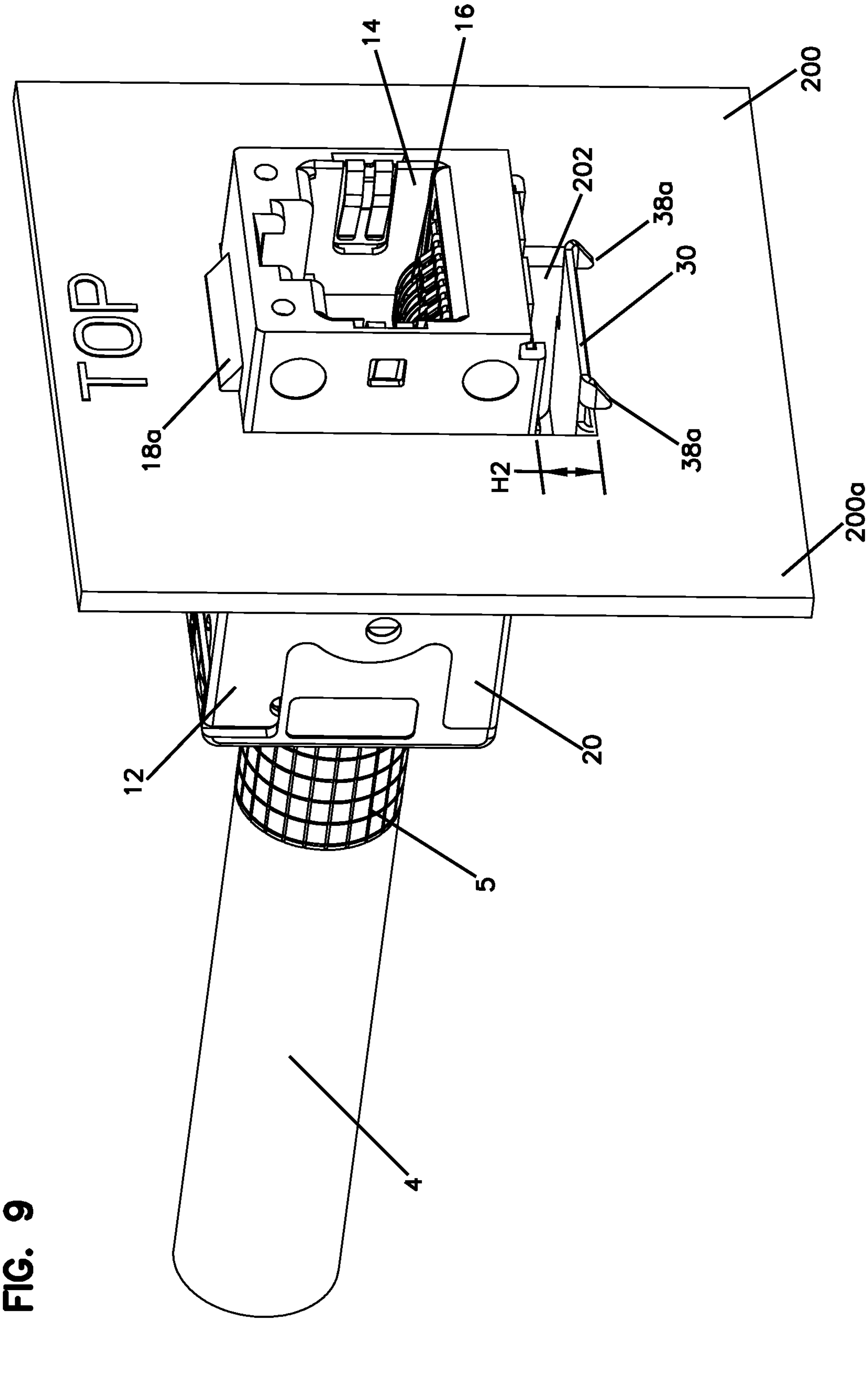
FIG. 9 is a front perspective view of the assembled connector assembly and cable shown in FIG. 4 having been installed into a second connection panel having a second opening size.
Figure 10:
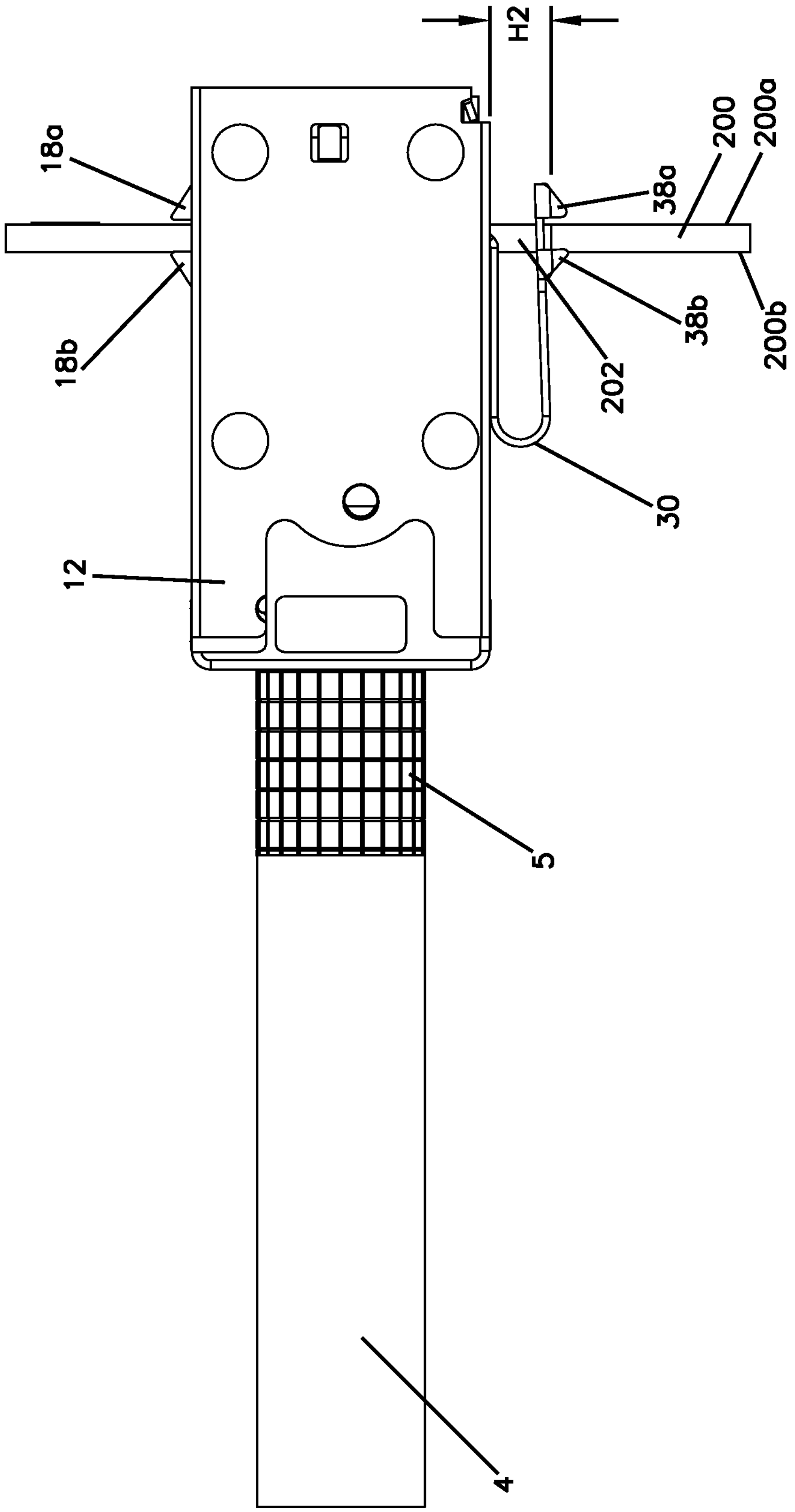
FIG. 10 is a side view of the assembled connector assembly, cable, and second connection panel shown in FIG. 9.
Figure 11:
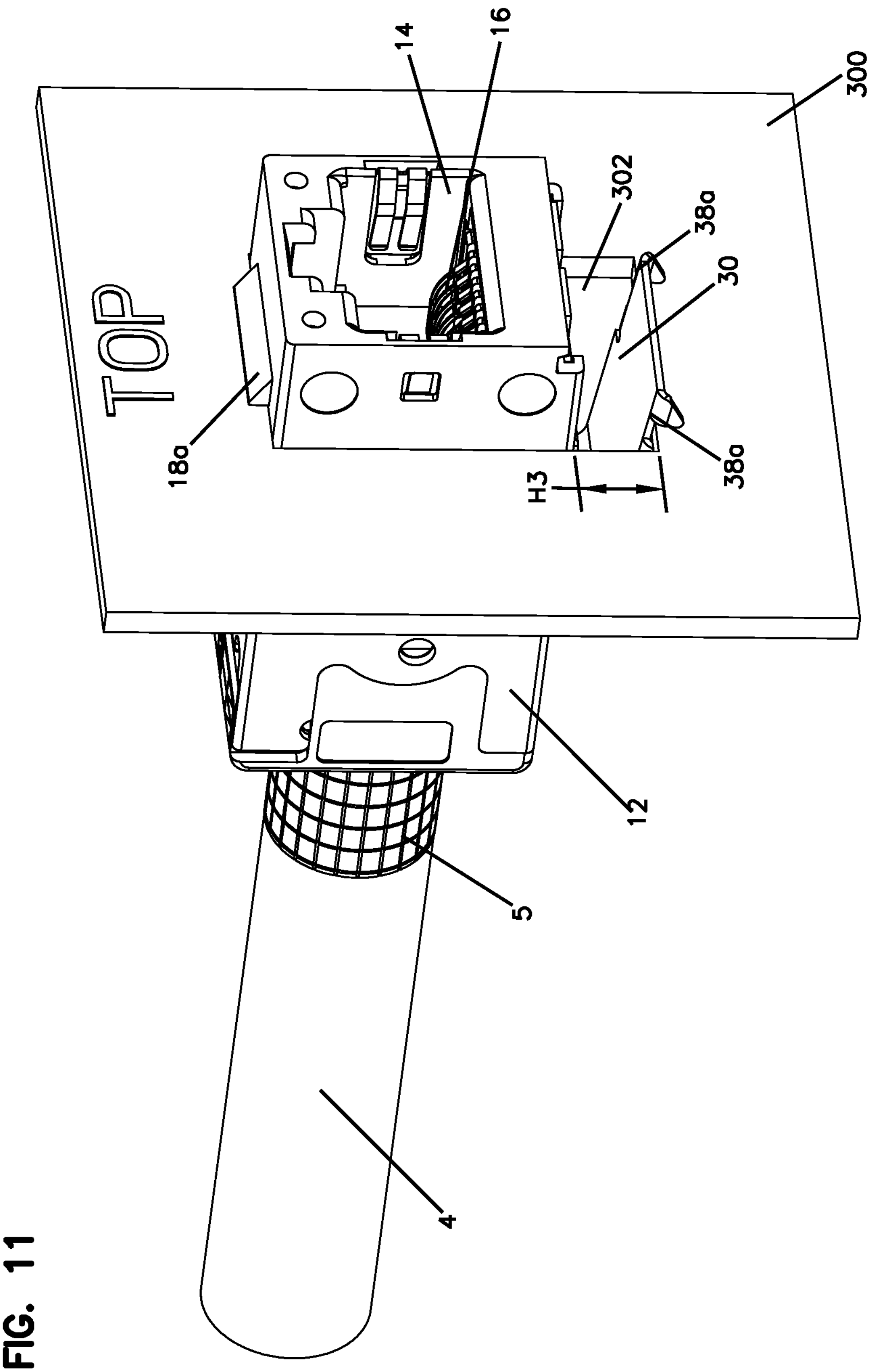
FIG. 11 is a front perspective view of the assembled connector assembly and cable shown in FIG. 4 having been installed into a third connection panel having a third opening size.
Figure 12:
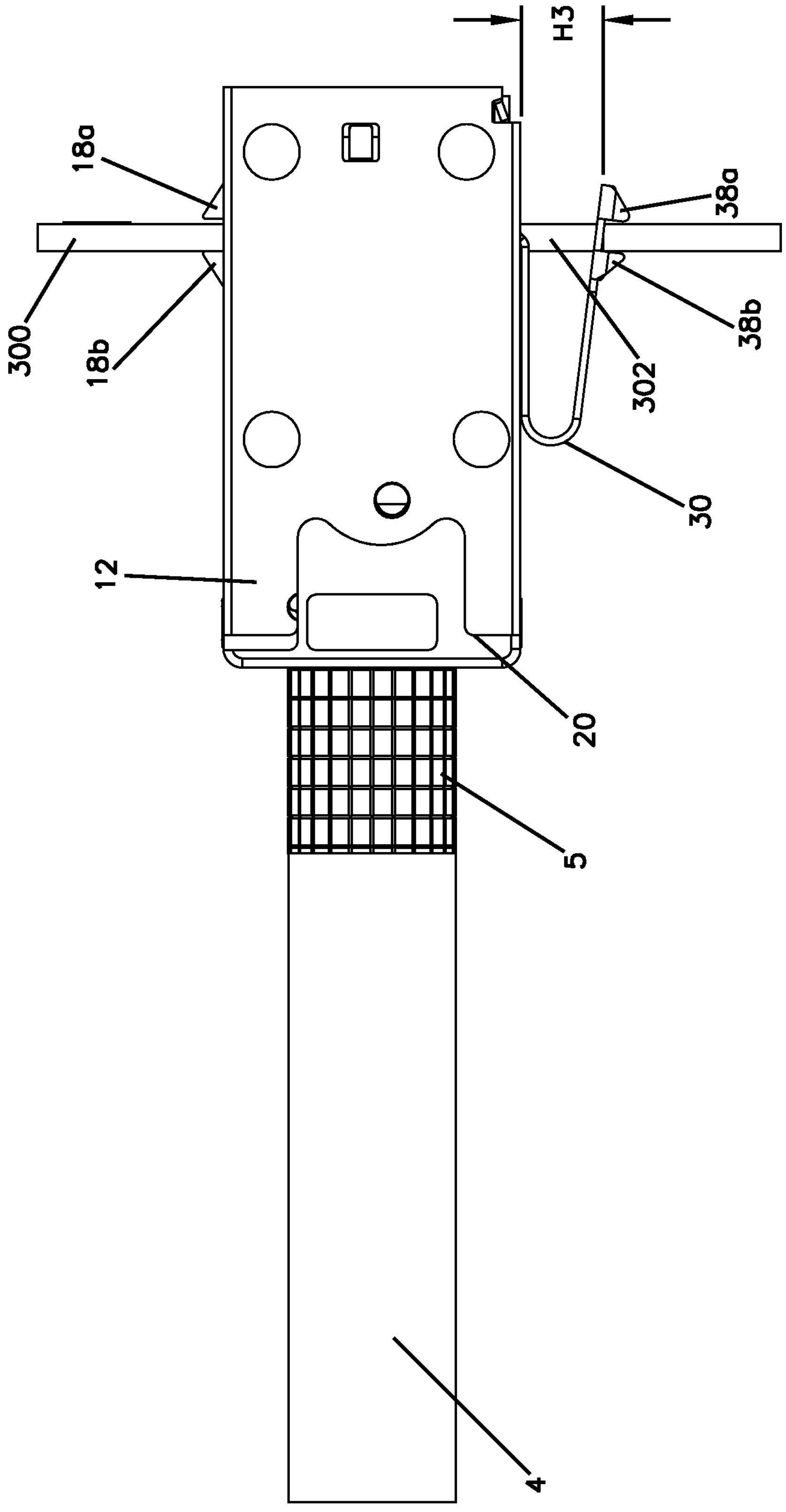
FIG. 12 is a side view of the assembled connector assembly, cable, and third connection panel shown in FIG. 11.

A primary benefit of the disclosed structure having a spring-type latch member 30 and a low profile main body 12 is that the same connector assembly 10 can be installed in panel openings of various different sizes. For example, in the embodiment shown at FIG. 8, a remaining height H1 exists between the main body 12 and the bottom of the opening 102 that can be accommodated by the latch. Referring to FIGS. 9 and 10, the same connector assembly 10 is shown as being connected to a different plate 200 having an opening 202 that is smaller than opening 102, resulting in a remaining height H2 that is less than height H1. Referring to FIGS. 11 and 12, the same connector assembly 10 is shown as being connected to yet another plate 300 having an opening 302 that is larger than opening 102, resulting in a remaining height H3 that is more than height H1. In one example, connector assembly 10 can be mounted into plates having opening heights of 19.3 millimeters (mm), 20.07 mm, and 20.6 mm, all of which are standard sized telecommunication openings that typically each require differently configured connectors.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST

4 cable
5 sheath
6 wires or filaments
10 connector assembly
12 main body
12_a_ latch tab cavity
14 jack cavity
16 electrical conductors
17 cavity
18 retention structure
18_a_ first member
18_b_ second member

19 channel structure
20 cable manager part
30 latch member
32 first portion
32*a* free end
34 second portion
36 third portion
38 locking rib structure
38*a* first rib
38*b* second rib
40 retention structure
40*a* first side edge
40*b* second side edge
42 tabs
44 ramped structure

What is claimed is:

1. A connector assembly comprising:

a. a main body extending between a front face and a rear end, the main body having a jack cavity within which a plurality of electrical contact members are disposed, the jack cavity extending to the front face of the main body, the main body having a first retention structure and a pair of recessed cavity portions defined at least partially on opposite side walls of the main body, the first retention structure and the pair of recessed cavity portions being located closer to the front face in comparison to the rear end of the main body, the main body further defining a central recess located on a side opposite the first retention structure and between the opposite side walls; and b. a latch member removably mounted to the main body, the latch member being formed as a flexible metal spring having a first portion joined to a second portion by a bent portion, the first portion having a locking rib structure at a free end opposite the bent portion, the latch member further including a pair of bent tabs elastically deflected into the pair of recessed cavity portions to secure the latch member to the main body, wherein the first portion and locking rib structure can be depressed towards the main body, wherein the latch member second portion is received by the central recess wherein the central recess defines a flat bottom surface extending parallel to the side of the main body opposite the first retention structure, wherein the second portion of the latch member includes a first planar section received within the central recess, wherein the first planar section extends parallel to and contacts the flat bottom surface of the central recess, wherein the second portion includes a second planar section connected to the first planar section by a ramped portion, the second planar section being in contact with the side of the main body opposite the first retention structure, and wherein the central recess extends to the front face of the main body.

2. The connector assembly of claim 1, wherein the latch member is deflectable such that a height between a top surface of the main body, proximate the first retention structure, and the free end of the latch member, proximate the locking rib structure, can vary between a first installed height and a second installed height, the second installed height being greater than the first installed height by 1 millimeter or more, wherein the second installed height is greater than the first installed height by up to and including 1.3 millimeters.

3. The connector assembly of claim 2, wherein the first installed height is 19.3 millimeters and the second installed height is 20.6 millimeters.

4. The connector assembly of claim 2, wherein the bent portion has a curved shape.

5. The connector assembly of claim 1, wherein the bent portion places the first portion at a non-zero angle with respect to the second portion in a relaxed state.

6. The connector assembly of claim 1, wherein the latch member is slidably mounted to the main body.

7. The connector assembly of claim 6, wherein the main body includes a channel structure into which the latch member slidably mounts.

8. The connector assembly of claim 1, wherein each of the pair of recessed cavities is at least partially defined within a top side wall of the main body.

9. The connector assembly of claim 1, wherein the connector assembly is an RJ-type connector.

10. The connector assembly of claim 1, wherein the locking rib structure includes a first locking rib structure located at a first side of the first portion and a second locking rib structure being spaced apart from the first locking rib structure and located at a second side of the first portion, wherein the first and second locking rib structures each include a first rib and a spaced apart second rib.

* * * * *